US011847279B2

(12) United States Patent
Hirai

(10) Patent No.: US 11,847,279 B2
(45) Date of Patent: Dec. 19, 2023

(54) DISPLAY SYSTEM, CONTROL DEVICE, AND CONTROL METHOD

(71) Applicant: Panasonic Intellectual Property Management Co., Ltd., Osaka (JP)

(72) Inventor: Atsushi Hirai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 31 days.

(21) Appl. No.: 17/590,177

(22) Filed: Feb. 1, 2022

(65) Prior Publication Data

US 2022/0155938 A1 May 19, 2022

Related U.S. Application Data

(63) Continuation of application No. PCT/JP2020/027708, filed on Jul. 16, 2020.

(30) Foreign Application Priority Data

Aug. 7, 2019 (JP) ................................. 2019-145168

(51) Int. Cl.
*G06F 3/041* (2006.01)

(52) U.S. Cl.
CPC ........ *G06F 3/04184* (2019.05); *G06F 3/0412* (2013.01)

(58) Field of Classification Search
CPC ...... G06F 3/041–047; G06F 2203/041–04114; G06F 3/04182;

(Continued)

(56) References Cited

U.S. PATENT DOCUMENTS 9,285,937 B2     3/2016  Kida et al.
2014/0152617 A1* 6/2014  Kida ................... G06F 3/04166
                                                      345/174

(Continued)

FOREIGN PATENT DOCUMENTS

JP   2014-132445 A   7/2014
WO  2018/123813 A1   7/2018

OTHER PUBLICATIONS

International Search Report (including English Language Translation), dated Sep. 15, 2020, in International Application No. PCT/JP2020/027708.

*Primary Examiner* — Sanjiv D. Patel
(74) *Attorney, Agent, or Firm* — GREENBLUM & BERNSTEIN, P.L.C.

(57) ABSTRACT

A display device includes a plurality of common electrodes. A second drive circuit supplies a touch drive signal to each of the plurality of common electrodes. A touch detection circuit performs detection of a touch by an object to the display device, based on a touch detection signal received from each of the plurality of common electrodes in one or more touch detection periods. A length of the one or more touch detection periods is a detection time. The touch detection circuit detects a noise at a frequency of the touch drive signal based on the touch detection signal. When the noise is detected, the control circuit changes the frequency of the touch drive signal to be lower than the frequency used when the noise is not detected and changes the detection time to be longer than the detection time used when the noise is not detected.

9 Claims, 15 Drawing Sheets

(58) Field of Classification Search
CPC ............... G06F 3/04184; G06F 3/0416; G06F 3/04166; H10K 59/40
See application file for complete search history.

(56) References Cited

U.S. PATENT DOCUMENTS

2015/0370401 A1* 12/2015 Mizuhashi ............ G06F 3/0446
 345/174
2016/0147350 A1 5/2016 Kida et al.
2018/0232078 A1* 8/2018 Choi .................... G06F 3/0418

* cited by examiner

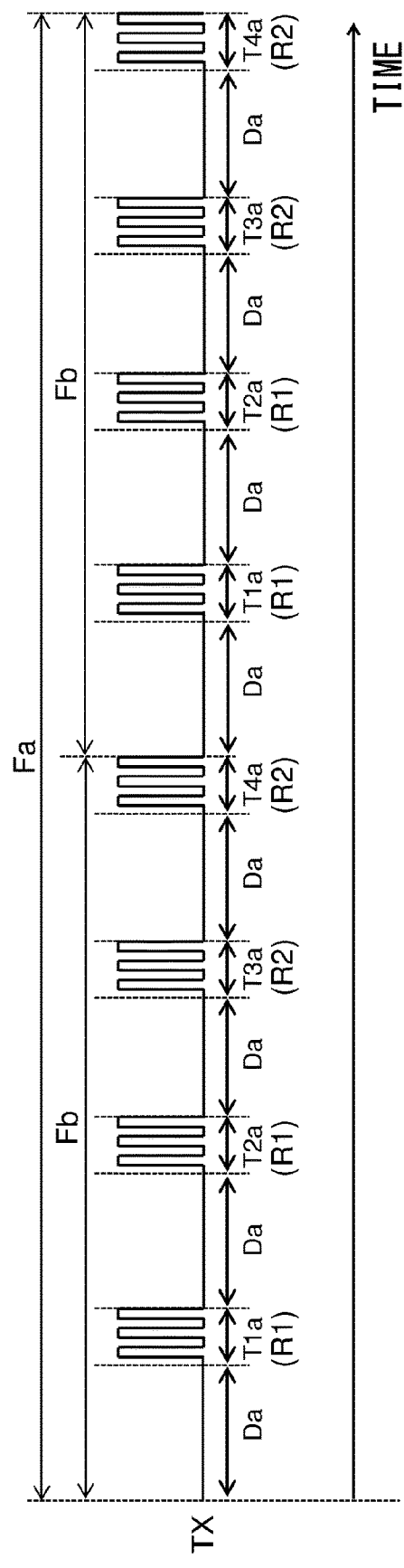

DISPLAY SYSTEM, CONTROL DEVICE, AND CONTROL METHOD

BACKGROUND

1. Field

The present disclosure relates to a display system provided with a touch detection function, a control device, and a control method.

2. Description of the Related Art

An in-cell display device, in which a touch sensor for detecting a user's touch position is built into a display panel, is known (see Patent Literature 1, for example). In such a display device, a common electrode used to supply a common voltage to each pixel of a liquid crystal display panel is divided into multiple common electrodes, which are also used as touch sensor electrodes. During an image display period, a common voltage is supplied to each of the multiple common electrodes, and, during a touch detection period, a touch drive signal for touch detection is supplied to each of the multiple common electrodes.
[Patent Literature 1] WO2018/123813

SUMMARY

For in-cell display devices, further improvement has been required.

To solve the problem above, a display system according to one aspect of the present disclosure includes a display device including a plurality of common electrodes used for both image display and touch detection; a drive circuit that supplies a touch drive signal to each of the plurality of common electrodes; a touch detection circuit that performs detection of a touch by an object to the display device, based on a touch detection signal received from each of the plurality of common electrodes in one or more touch detection periods, a length of the one or more touch detection periods being a detection time; and a control circuit that controls the drive circuit and the touch detection circuit. Within a frame period of the display device, a display period for which the display device displays an image and a touch detection period are alternately arranged, the touch detection circuit detects a noise at a frequency of the touch drive signal based on the touch detection signal, and, when the noise is detected, the control circuit changes the frequency of the touch drive signal to be lower than the frequency used when the noise is not detected and changes the detection time to be longer than the detection time used when the noise is not detected.

Another aspect of the present disclosure is a control device. The device is a control device adapted to control a display device including a plurality of common electrodes used for both image display and touch detection, the control device including: a drive circuit that supplies a touch drive signal to each of the plurality of common electrodes; a touch detection circuit that performs detection of a touch by an object to the display device, based on a touch detection signal received from each of the plurality of common electrodes in one or more touch detection periods, a length of the one or more touch detection periods being a detection time; and a control circuit that controls the drive circuit and the touch detection circuit, wherein, within a frame period of the display device, a display period for which the display device displays an image and a touch detection period are alternately arranged. The touch detection circuit detects a noise at a frequency of the touch drive signal based on the touch detection signal, and, when the noise is detected, the control circuit changes the frequency of the touch drive signal to be lower than the frequency used when the noise is not detected and changes the detection time to be longer than the detection time used when the noise is not detected.

Yet another aspect of the present disclosure is a control method. The method is a control method adapted for a display device including a plurality of common electrodes used for both image display and touch detection, a display period for which the display device displays an image and a touch detection period being alternately arranged within a frame period of the display device, the control method including: supplying a touch drive signal to each of the plurality of common electrodes; performing detection of a touch by an object to the display device, based on a touch detection signal received from each of the plurality of common electrodes in one or more touch detection periods, a length of the one or more touch detection periods being a detection time; detecting a noise at a frequency of the touch drive signal based on the touch detection signal; and changing, when the noise is detected, the frequency of the touch drive signal to be lower than the frequency used when the noise is not detected and changing the detection time to be longer than the detection time used when the noise is not detected.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 7 shows the timing of the frame period and the waveforms of the touch drive signal according to the second embodiment used when a noise is detected;

DETAILED DESCRIPTION

The invention will now be described by reference to the preferred embodiments. This does not intend to limit the scope of the present invention, but to exemplify the invention.

(Base Findings of Present Disclosure)

Before specific description of embodiments are given, the base findings will be described. In an in-cell touch display, no electrodes are provided nearer the viewer than the common electrode. Therefore, exogenous noise produced by a wireless signal around reaches the common electrode more easily than in an out-cell display device in which a touch sensor electrode is provided nearer the viewer than the common electrode. If the frequency of the exogenous noise arriving at the common electrode is equal to the frequency of a touch drive signal, a touch may be detected falsely. When an exogenous noise at a frequency of a touch drive signal is detected, false detection can be suppressed by performing frequency-hopping control to change the frequency of the touch drive signal.

In an in-cell touch display, a frame period is time-divided into multiple display periods and multiple touch detection periods. Therefore, the length of a touch detection period is limited. The inventor has found a problem in that lowering the frequency of a touch drive signal decreases the number of pulses of the touch drive signal in one touch detection period and so may lower the touch detection sensitivity. In order to solve the problem, a display system according to the present disclosure is configured as described below.

First Embodiment

Figure 1:
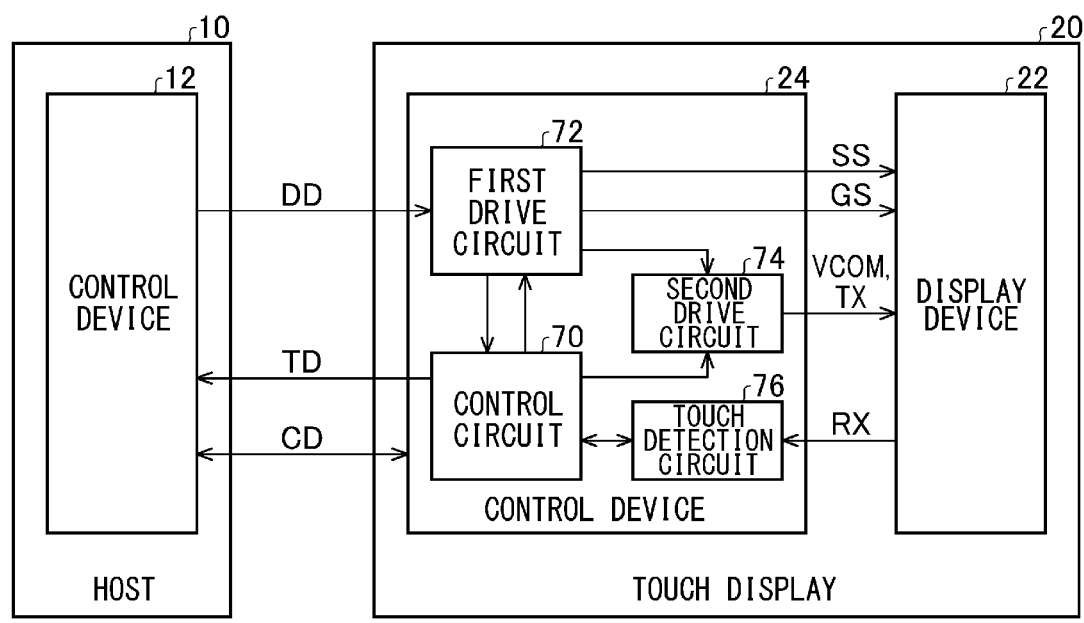
FIG. 1 is a block diagram of a display system according to the first embodiment.

FIG. 1 is a block diagram of a display system 1 according to the first embodiment. Although an example will be described in which the display system 1 is a vehicle-mounted display system 1 mounted on a vehicle, such as an automobile, the application is not particularly limited, and the display system 1 may also be used for a mobile device.

The display system 1 includes a host 10 and a touch display 20. The host 10 performs various functions, such as radio, car navigation, and Bluetooth (registered trademark) communication, and controls the touch display 20. The host 10 includes a control device 12.

The control device 12 may be a CPU, for example, and also called a host CPU. The control device 12 supplies image data DD and control data CD to the touch display 20 and controls the touch display 20 based on such data.

The touch display 20 includes a display device 22 and a control device 24. The display device 22 may be used as a center display, on which a car navigation screen or the like is displayed, within a vehicle cabin, for example.

The display device 22 is an in-cell liquid crystal display device of an in plane switching (IPS) type and configured as a touch display on which a touch position can be detected.

The configuration of the display device 22 may be a well-known configuration as described below, for example.

Figure 2:
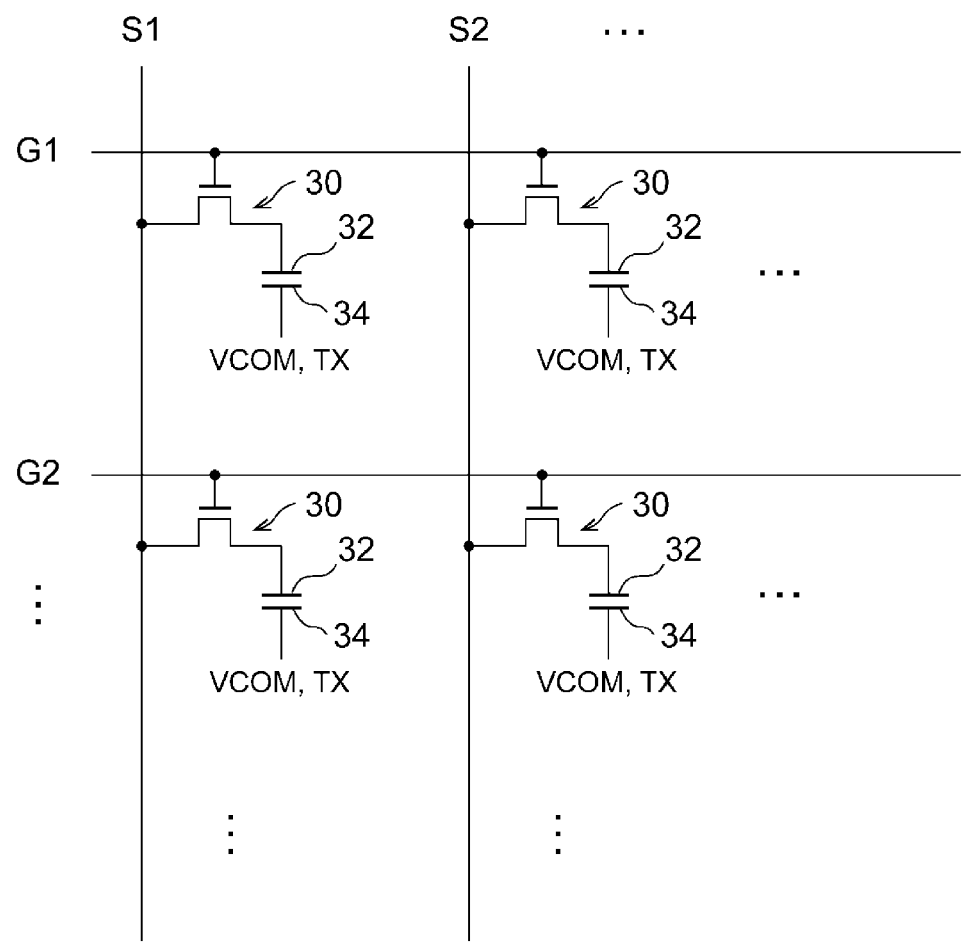
FIG. 2 schematically shows a circuit configuration of the display device shown in FIG. 1.

FIG. 2 schematically shows a circuit configuration of the display device 22 shown in FIG. 1. FIG. 2 also shows a schematic arrangement of constituting elements. The display device 22 includes multiple gate lines G1, G2, and so on extending in a row direction, multiple source lines S1, S2, and so on extending in a column direction, multiple pixel switching elements 30, multiple pixel electrodes 32, and multiple common electrodes 34. Each pixel switching element 30 is a thin-film transistor provided near an intersection of a gate line and a source line such as to correspond to a pixel. In each pixel switching element 30, the gate is connected with a gate line, the source is connected with a source line, and the drain is connected with a pixel electrode 32. For one common electrode 34, multiple pixel switching elements 30 and multiple pixel electrodes 32 are arranged. The liquid crystal layer is controlled by means of electric fields between pixel electrodes 32 and common electrodes 34. The common electrodes 34 are used for both image display and touch detection. Accordingly, the number of electrode layers can be reduced, so that the display device 22 can be made thinner. The common electrodes 34 may also be referred to as sensor electrodes.

Figure 3:
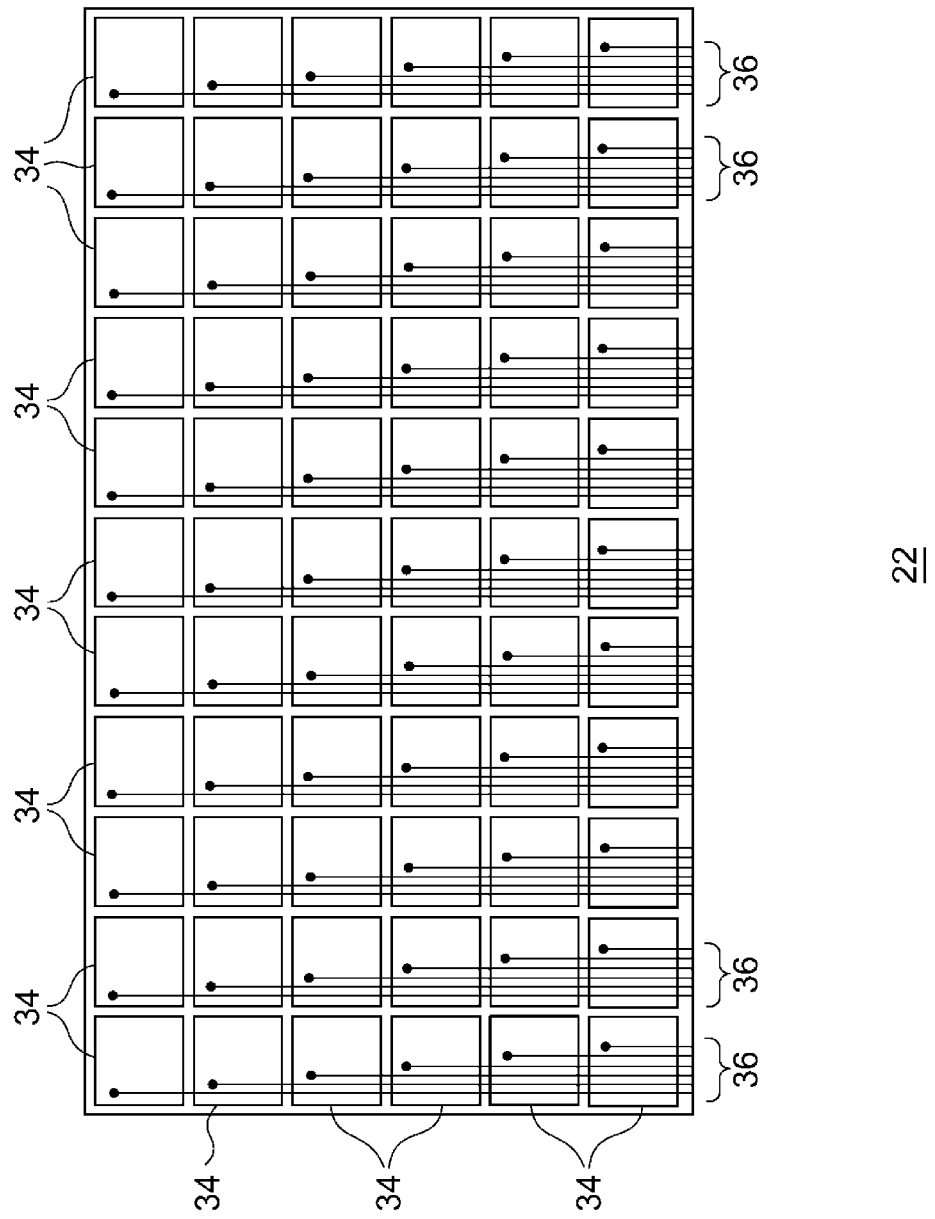
FIG. 3 is a top view that shows an arrangement of the common electrodes shown in FIG. 2.

FIG. 3 is a top view that shows an arrangement of the common electrodes 34 shown in FIG. 2. The multiple common electrodes 34 are arranged in a matrix. Each common electrode 34 is connected to the control device 24 with a signal line 36.

The display device 22 detects a touch position based on the self-capacitance method. When a finger is brought closer to the display surface of the display device 22, capacitance is formed between a common electrode 34 and the finger. The formation of capacitance increases parasitic capacitance in the common electrode 34, so that the current flowing when a touch drive signal is supplied to the common electrode 34 is increased. Based on the current variation, the touch position is detected.

Figure 4:
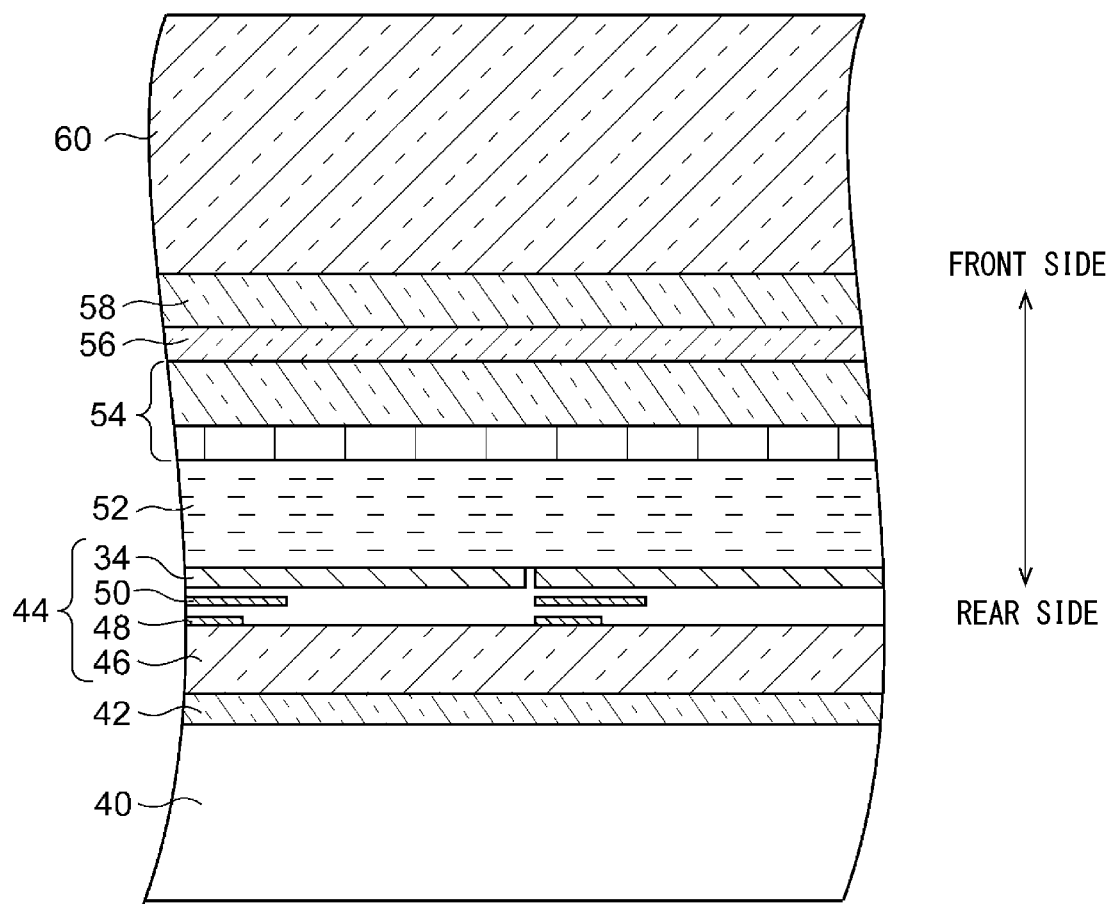
FIG. 4 is a longitudinal sectional view of the display device shown in FIG. 1.

FIG. 4 is a longitudinal sectional view of the display device 22 shown in FIG. 1. The display device 22 includes a backlight unit 40, a lower polarizer 42, a thin-film transistor substrate (hereinafter, referred to as a TFT substrate) 44, a liquid crystal layer 52, a color filter substrate 54, an upper polarizer 56, a bonding layer 58, and a protection layer 60, which are laminated and disposed in this order along a depth direction.

In the following, with regard to the depth directions of the display device 22, the side on which the protection layer 60 is positioned with respect to the TFT substrate 44 is defined as the front side, and the opposite side is defined as the rear side.

Using the light emitted from the backlight unit 40, the display device 22 emits image light toward the front side, or the viewer side.

The TFT substrate 44 includes a glass substrate 46 and also includes multiple gate electrodes 48, multiple source electrodes 50, and multiple common electrodes 34, which are arranged on the front side of the glass substrate 46. The TFT substrate 44 also includes the multiple gate lines G1, G2, and so on, the multiple source lines S1, S2, and so on, the multiple pixel electrodes 32, and the multiple pixel switching elements 30 shown in FIG. 2, though the illustration thereof is omitted. The liquid crystal layer 52 disposed on the front side of the TFT substrate 44 is controlled by means of lateral electric fields that occur between pixel electrodes 32 and common electrodes 34.

The bonding layer 58 has translucency and bonds the upper polarizer 56 and the protection layer 60. The bonding layer 58 may be formed by curing transparent resin in a liquid state, such as optically clear resin (OCR), or curing a transparent adhesive sheet, such as optically clear adhesive (OCA), for example.

The protection layer 60 is a layer that has translucency and protects the display device 22, and the protection layer 60 is constituted by a glass substrate or a plastic substrate, for example. The protection layer 60 is also called a cover lens, for example.

The description now returns to FIG. 1. The control device 24 may be configured as an IC, for example, and controls the display device 22 based on the control data CD and the image data DD from the host 10. The control device 24 includes a control circuit 70, a first drive circuit 72, a second drive circuit 74, and a touch detection circuit 76.

The control circuit 70 may be configured as a microcomputer, for example, and controls signal generation timing of the first drive circuit 72 and the second drive circuit 74, touch detection timing of the touch detection circuit 76, and the like.

The control circuit 70 controls the first drive circuit 72, the second drive circuit 74, and the touch detection circuit 76 such that, during a frame period (one frame period), one frame of a display image is rendered on the display device 22 and touch detection for one screen is performed at least once. The frame period may also be referred to as a vertical synchronization period. The frame period will be detailed later.

The first drive circuit 72 generates a reference clock signal under the control of the control circuit 70. The first drive circuit 72 also generates, under the control of the control circuit 70, a source signal SS in synchronization with the generated reference clock signal, based on the image data DD from the host 10. The first drive circuit 72 also generates, under the control of the control circuit 70, a gate signal GS in synchronization with the generated reference clock signal.

The first drive circuit 72 supplies the source signal SS serially to multiple source lines in the display device 22, and also supplies the gate signal GS serially to multiple gate lines in the display device 22.

The first drive circuit 72 supplies the reference clock signal to the second drive circuit 74. The second drive circuit 74 generates a reference voltage VCOM, which is a predetermined fixed voltage, and a touch drive signal TX in synchronization with the reference clock signal, under the control of the control circuit 70. The touch drive signal TX may be a square wave signal, or may be a sine wave signal. Through the signal lines 36 shown in FIG. 3, the second drive circuit 74 supplies the reference voltage VCOM or the touch drive signal TX to the multiple common electrodes 34 in the entire display device 22.

The touch detection circuit 76 performs detection of a touch by an object to the display device 22. Under the control of the control circuit 70, the touch detection circuit 76 performs detection of a touch by an object to a position corresponding to a common electrode 34, based on a touch detection signal RX received from each common electrode 34 when the touch drive signal TX is supplied to the common electrode 34.

The touch detection circuit 76 integrates the touch detection signal RX received from each common electrode 34 and derives, as a detection value, a difference between the integral value and a reference value, for each pulse timing of the touch drive signal TX. For the touch detection signal RX received from one common electrode 34 during one touch detection period, the number of obtained detection values is identical with the number of pulses of the touch drive signal TX within one touch detection period. Each detection value represents a difference value between the capacitance of the common electrode 34 and a reference capacitance. When the capacitance variation in a common electrode 34 due to a touch by an object is larger, the detection value becomes larger. When there is no touch and the capacitance variation in a common electrode 34 is zero, the detection value is also zero. For each of the touch detection signals RX received from the common electrodes 34, the touch detection circuit 76 derives the sum of multiple detection values within one or more touch detection period.

The touch detection circuit 76 compares the sum of the detection values derived based on the touch detection signal RX received from each common electrode 34 with a predetermined touch detection threshold. When the sum of the detection values is greater than or equal to the touch detection threshold, the touch detection circuit 76 judges that there has been a touch to the position of the corresponding common electrode 34. This corresponds to detection of a touch. Based on the position of the common electrode 34 to which it is judged that there has been a touch, the touch detection circuit 76 detects a touch position within the screen. The touch detection circuit 76 outputs touch position information of the touch position thus detected to the control circuit 70.

Based on the touch position information from the touch detection circuit 76, the control circuit 70 derives coordinate data TD of the touch position and outputs a touch report including the derived coordinate data TD to the control device 12 in the host 10 when the touch detection for one screen is completed. The control device 12 performs various processes based on the coordinate data TD.

The display system 1 performs frequency hopping control in accordance with a level of exogenous noise. For frequency hopping, a well-known technology can be used. For example, the touch detection circuit 76 detects, for each set of a predetermined number of frame periods, the noise at the frequency of the touch drive signal TX, based on the result of detection of touch positions for one screen. When the noise at the frequency of the touch drive signal TX arrives at multiple common electrodes 34, multiple detection values relevant to those common electrodes 34 increase so that it is judged that there has been a touch at multiple positions within the screen. The touch detection circuit 76 judges that there has been a noise when, for example, a predetermined number of touch positions or greater in a predetermined distribution are detected in the result of detecting touch positions for one screen. This corresponds to detection of a noise at the frequency of the touch drive signal TX. When a noise is detected, the touch detection circuit 76 supplies noise detection information to the control circuit 70.

When the display system 1 is started, the control circuit 70 determines the frequency of the touch drive signal TX to be a predetermined first frequency. The first frequency corresponds to the frequency of the touch drive signal TX used when no noise is detected. When noise detection information is supplied while the first frequency is in use, i.e., when a noise is detected, the control circuit 70 changes the frequency of the touch drive signal TX to a predetermined second frequency lower than the first frequency. The second drive circuit 74 supplies the touch drive signal TX at the second frequency to the common electrode 34 under the control of the control circuit 70. This suppresses the touch detection precision or sensitivity from being lowered due to exogenous noise.

When a noise is detected while the second frequency is in use, the control circuit 70 changes the frequency of the touch drive signal TX to the first frequency.

When a noise is detected while the second frequency is in use, the control circuit 70 may change the frequency of the touch drive signal TX to a predetermined third frequency. The third frequency may be lower than the second frequency, or a frequency between the first frequency and the second frequency, or higher than the first frequency. In this case, the control circuit 70 may change the frequency of the touch drive signal TX to the first frequency when a noise is detected while the third frequency is in use. The number of frequencies to switch to may be determined as appropriate depending on the length of the touch detection period, the performance of the touch detection circuit 76, etc.

The configurations of the control device 12 and the control circuit 70 can be implemented by cooperation between hardware resources and software resources or only by hardware resources. As the hardware resources, analog devices, microcomputers, DSPs, ROMs, RAMs, FPGAs, or other LSIs can be employed. As the software resources, programs, such as firmware, can be employed.

In the following, the control of the display device 22 performed by the control circuit 70 and the operations of the display device 22 will be specifically described. The control circuit 70 alternately repeats partial image display on one of multiple display regions within the screen and partial touch detection on one of multiple touch detection regions within the screen, so as to control the image display and the touch detection in a time division manner.

Figure 5:
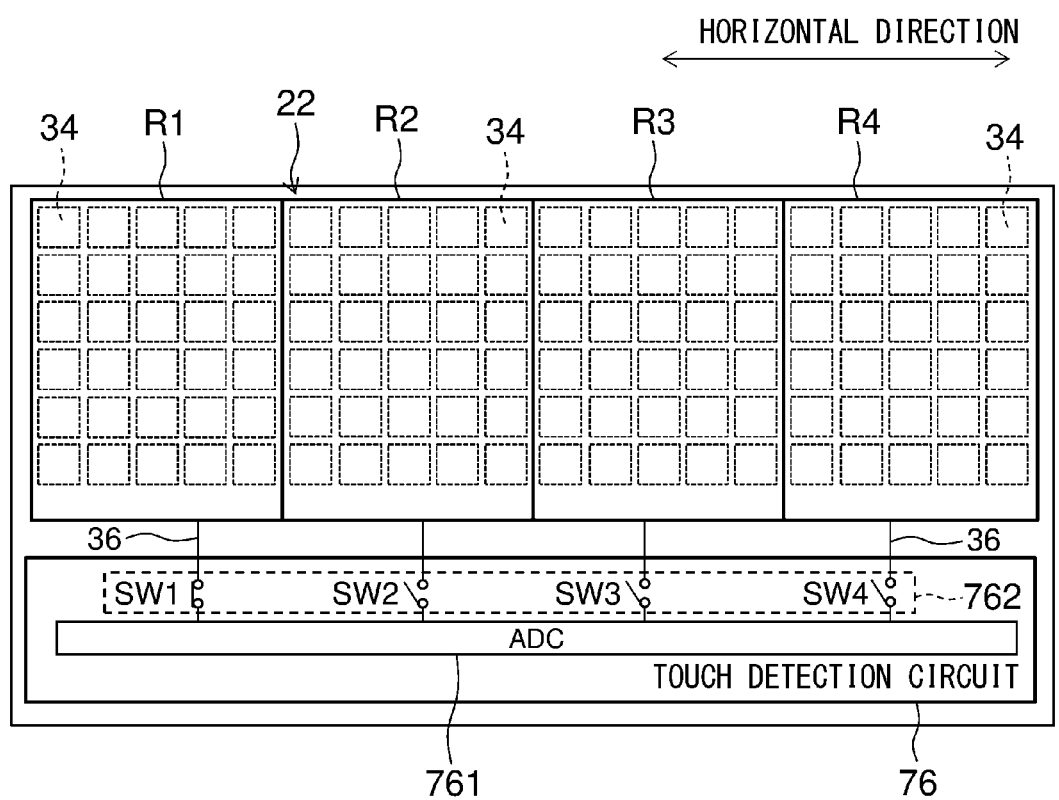
FIG. 5 is a diagram used to describe operations of the display device shown in FIG. 1.

FIG. 5 is a diagram used to describe operations of the display device 22 shown in FIG. 1. The display device 22 includes four touch detection regions R1, R2, R3, and R4, which are configured by dividing the multiple common electrodes 34 within the screen into multiple groups. The touch detection regions R1 through R4 are horizontally arranged from the left to the right in this order when viewed from the viewer. Among the multiple common electrodes 34 of the entire display device 22, multiple (two or more) common electrodes 34 are arranged in each of the touch detection regions R1 through R4. The number of common electrodes 34 arranged in each touch detection region shown in FIG. 5 is by way of example only. In the display device 22, the number of first touch detection regions is not limited to "four". The touch detection regions may be vertically arranged when viewed from the viewer.

The touch detection circuit 76 includes an A/D converter 761, and switches SW1, SW2, SW3, and SW4. Each switch includes multiple pairs of an input terminal and an output terminal, though the illustration thereof is omitted. For simplified drawing, the connections between the common electrodes 34 and the signal lines 36 are omitted in FIG. 5.

The multiple input terminals of the switch SW1 are respectively connected to the multiple common electrodes 34 included in the touch detection region R1 on a one-to-one basis, with the signal lines 36. The multiple input terminals of the switch SW2 are respectively connected to the multiple common electrodes 34 included in the touch detection region R2 on a one-to-one basis, with the signal lines 36. The multiple input terminals of the switch SW3 are respectively connected to the multiple common electrodes 34 included in the touch detection region R3 on a one-to-one basis, with the signal lines 36. The multiple input terminals of the switch SW4 are respectively connected to the multiple common electrodes 34 included in the touch detection region R4 on a one-to-one basis, with the signal lines 36.

The output terminals of the switches SW1 through SW4 are connected to input ports of the A/D converter 761. Since the number of input ports of the A/D converter 761 is less than the number of common electrodes 34 within the screen, the common electrodes 34 connected to the input ports of the A/D converter 761 are switched by means of the switches. The number of input ports of the A/D converter 761 is equal to the number of input signals that can be simultaneously processed at the A/D converter 761, and may also be referred to as the number of input channels.

The control circuit 70 exercises different modes of control depending on whether a noise is detected.

(1) When a Noise at the First Frequency is not Detected

Figure 6A:
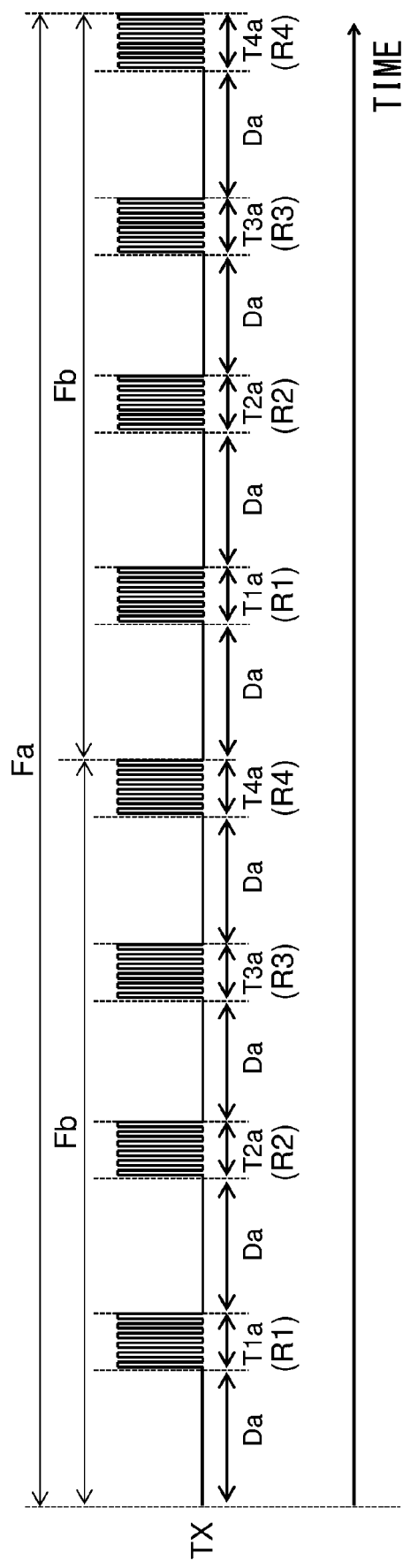
FIG. 6A shows the timing of the frame period and the waveforms of the touch drive signal in the display device shown in FIG. 1 used when no noise is detected.

FIG. 6A shows the timing of the frame period Fa and the waveforms of the touch drive signal TX in the display device 22 shown in FIG. 1 used when no noise is detected.

In the example shown in FIG. 6A, within a frame period (one frame period) Fa, one image is displayed and touch detection for one screen is performed twice. In the present embodiment, the display device 22 is assumed to be a display device driven at 60 Hz to display an image, so that the frame period Fa is set to about 16.7 ($=\frac{1}{60}$) ms. Since the touch detection for one screen is performed twice within a frame period Fa, the touch detection is performed with a period of about 8.3 ($=\frac{1}{120}$) ms. Therefore, the touch report rate is 120 Hz.

A frame period Fa is divided into two sub-frame periods Fb. Each sub-frame period Fb includes four display periods Da and four touch detection periods T1$a$, T2$a$, T3$a$, and T4$a$. The display periods Da and the touch detection periods are alternately arranged. In each sub-frame period Fb, the display period Da, touch detection period T1$a$, display period Da, touch detection period T2$a$, display period Da, touch detection period T3$a$, display period Da, and touch detection period T4$a$ are arranged in this order. The number of display periods Da and the number of touch detection periods in a frame period Fa are not limited to "eight".

The display device 22 displays one-eighth of a frame for each display period Da. Accordingly, one frame is displayed in the eight display periods Da within a frame period Fa. More specifically, during a display period Da, the first drive circuit 72 supplies the source signal SS to the multiple source lines and also supplies the gate signal GS to corresponding gate lines, and the second drive circuit 74 supplies the reference voltage VCOM to the multiple common electrodes 34. The second drive circuit 74 stops supply of the touch drive signal TX during the display periods Da.

During each touch detection period, the second drive circuit 74 supplies the touch drive signal TX to the multiple common electrodes 34 in the touch detection regions R1 through R4. The number of pulses included in one touch detection period is not limited to "six". The second drive circuit 74 stops supply of the reference voltage VCOM during the touch detection period.

The control circuit 70 also makes a different one of the switches SW1 through SW4 conductive for each touch detection period. The touch detection signals RX input to the switches thus made conductive are output to the A/D converter 761. The A/D converter 761 converts the analog touch detection signals RX input via the switches, into digital touch detection signals.

During the touch detection period T1$a$, the touch detection circuit 76 performs detection of a touch by an object to the touch detection region R1, based on the touch detection signals RX received from the multiple common electrodes 34 in the touch detection region R1. During the touch detection period T2a, the touch detection circuit 76 performs detection of a touch by an object to the touch detection region R2, based on the touch detection signals RX received from the multiple common electrodes 34 in the touch detection region R2.

During the touch detection period T3a, the touch detection circuit 76 performs detection of a touch by an object to the touch detection region R3, based on the touch detection signals RX received from the multiple common electrodes 34 in the touch detection region R3. During the touch detection period T4a, the touch detection circuit 76 performs detection of a touch by an object to the touch detection region R4, based on the touch detection signals RX received from the multiple common electrodes 34 in the touch detection region R4.

Thus, when a noise at the first frequency is not detected, the touch detection circuit 76 performs, based on the touch detection signal received in one touch detection period from the common electrodes 34 in the touch detection region as a detection target, detection of a touch in the touch detection region as a detection target for the one touch detection period. The length of one touch detection period is a detection time. The touch detection circuit 76 serially changes the touch detection region as a detection target and performs detection of a touch in a different touch detection region in each of the multiple touch detection periods. During the eight touch detection periods in a frame period Fa, touch detection for one screen is performed twice, and a touch report is output each time touch detection for one screen is completed.

(2) When a Noise at the First Frequency is Detected

Figure 6B:
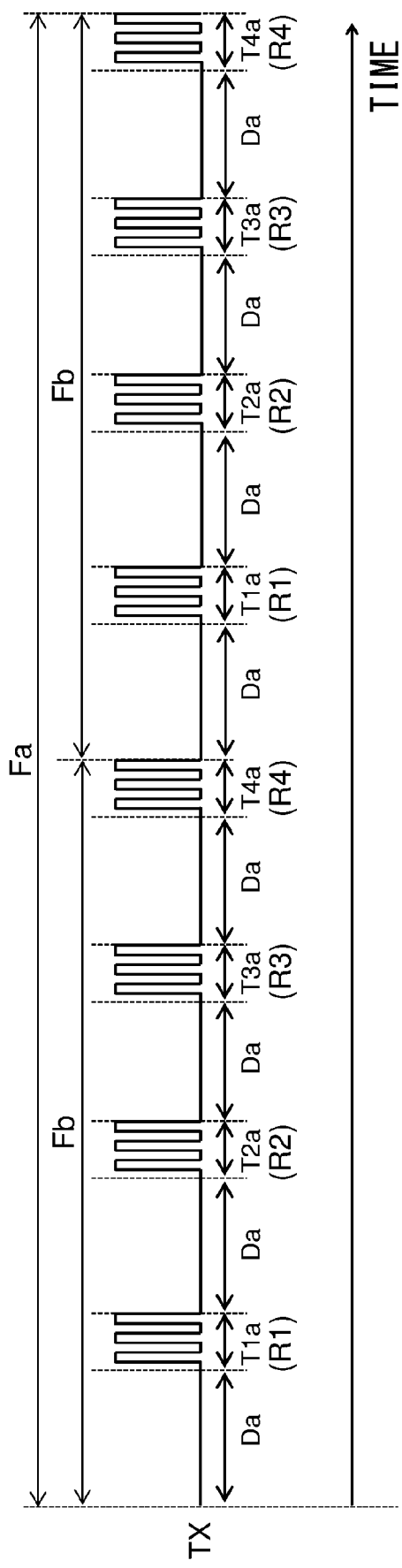
FIG. 6B shows the timing of the frame period and the waveforms of the touch drive signal in the display device shown in FIG. 1 used when a noise is detected.

FIG. 6B shows the timing of the frame period Fa and the waveforms of the touch drive signal TX in the display device 22 shown in FIG. 1 used when a noise is detected. The length of the frame period Fa, the length of the sub-frame period Fb, the length of each display period Da, the length of each touch detection period, the number of display periods Da, the number of touch detection periods, and the arrangement of the display period Da and the touch detection period are identical to those of the case of FIG. 6A in which no noise is detected. Therefore, the control is suppressed from becoming excessively complicated. Further, it is possible to display an image of the image quality equivalent to that of the case where no noise is detected.

The frequency of the touch drive TX is the second frequency and ½ of the first frequency. Therefore, the number of pulses included in one touch detection period is ½ of the case no noise is detected.

When a noise at the first frequency is detected, the control circuit 70 changes the frequency of the touch drive signal TX and configures the detection time to be longer than the detection time of the case no noise is detected. In this case, the detection time is doubled. The touch detection circuit 76 performs detection of a touch in the touch detection region R1 once in two touch detection periods T1a, based on the touch detection signals RX received in the two touch detection periods T1a in a frame period Fa. The length of the two touch detection periods T1a is the detection time. More specifically, the touch detection circuit 76 judges that there has been a touch when the sum of detection values based on the touch detection signals RX in the two touch detection periods T1a is greater than or equal to the touch detection threshold. The number of pulses of the touch drive signal TX included in the two touch detection periods T1a is equal to the number of pulses of the touch drive signal TX included in one touch detection period T1a used when no noise is detected. Therefore, the number of detection values obtained is equal to that obtained when no noise is detected. This causes the touch detection sensitivity to be equivalent to that of the case where no noise is detected and suppresses the sensitivity from decreasing.

Similarly, the touch detection circuit 76 performs detection of a touch in the touch detection region R2 once in two touch detection periods T2a, based on the touch detection signals RX received in the two touch detection periods T2a. The touch detection circuit 76 performs detection of a touch in the touch detection region R3 once in two touch detection periods T3a, based on the touch detection signals RX received in the two touch detection periods T3a. The touch detection circuit 76 performs detection of a touch in the touch detection region R4 once in two touch detection periods T4a, based on the touch detection signals RX received in the two touch detection periods T4a.

Thus, when a noise is detected, the touch detection circuit 76 performs, based on the touch detection signal RX received in a predetermined number of multiple touch detection periods from the common electrodes 34 in the touch detection region as a detection target, detection of a touch in the touch detection region as a detection target for each set of the multiple touch detection periods. The touch detection circuit 76 serially changes the touch detection region as a detection target and performs detection of a touch in a different touch detection region in each set of the predetermined number of multiple touch detection periods.

Whether there has been a touch is not judged at a point of time when the first sub-frame period Fb ends. Judgment as to whether there has been a touch for one screen is completed and the control circuit 70 outputs a touch report at a point of time when the frame period Fa ends. In other words, the touch report rate is ½ of the case where no noise is detected and is 60 Hz.

Second Embodiment

The second embodiment differs from the first embodiment in that touch detection is performed only in part of the multiple touch detection regions when a noise is detected. The difference from the first embodiment will be highlighted below.

When a noise is detected, the touch detection circuit 76 performs detection of a touch in the predetermined some of multiple touch detection regions R1 through R4, i.e., in the touch detection regions R1, R2 and does not perform detection of a touch in rest of the touch detection regions R1 through R4, i.e., in the touch detection regions R3, R4. It is assumed that the touch detection regions R1, R2 have a higher priority than the touch detection regions R3, R4 and include a region in which a GUI (Graphical User Interface) such as that for emergency messaging is displayed. The number of touch detection regions in which detection of a touch is performed and the number of touch detection regions in which detection of a touch is not performed may not be equal and may be 1 or more.

FIG. 7 shows the timing of the frame period Fa and the waveforms of the touch drive signal TX according to the second embodiment used when a noise is detected. Referring to FIG. 7, the length of the frame period Fa, the length of the sub-frame period Fb, the length of each display period Da, the length of each touch detection period, the number of display periods Da, the number of touch detection periods, and the arrangement of the display period Da and the touch detection period are identical to those of the case of the first embodiment where a noise is detected. The touch detection region in which a touch is detected in each of the touch detection periods T2a, T3a, T4a differs from that of the first embodiment. A touch in the touch detection region R1 is detected in the touch detection period T2a, a touch in the touch detection region R2 is detected in the touch detection period T3a, and a touch in the touch detection region R2 is detected in the touch detection period T4a.

In each sub-frame period Fb, the touch detection circuit 76 performs detection of a touch in the touch detection region R1 based on the sum of detection values obtained in the two touch detection periods T1a, T2a and performs detection of a touch in the touch detection region R2 based on the sum of detection values obtained in the two touch detection periods T3a, T4a. The length of two touch detection periods is the detection time. The number of pulses of the touch drive signal TX included in the two touch detection periods is equal to the number of pulses of the touch drive signal TX included in one touch detection period used when no noise is detected. This ensures an equivalent touch detection sensitivity and suppresses the sensitivity from decreasing.

Judgment as to whether there has been a touch for one screen is completed and the control circuit 70 outputs a touch report at a point of time when the sub-frame period Fb ends. Accordingly, it is ensured that the touch report rate is equal to that of the case where no noise is detected. In other words, the number of touch detection regions in which detection of a touch is performed when a noise is detected is smaller as compared with that of the first embodiment so that the touch report rate can be increased accordingly.

Third Embodiment

In the third embodiment, the two touch detection periods according to the first embodiment in which a noise is detected are aggregated into one, and the two display periods are aggregated into one. The difference from the first embodiment will be highlighted below.

Figure 8:
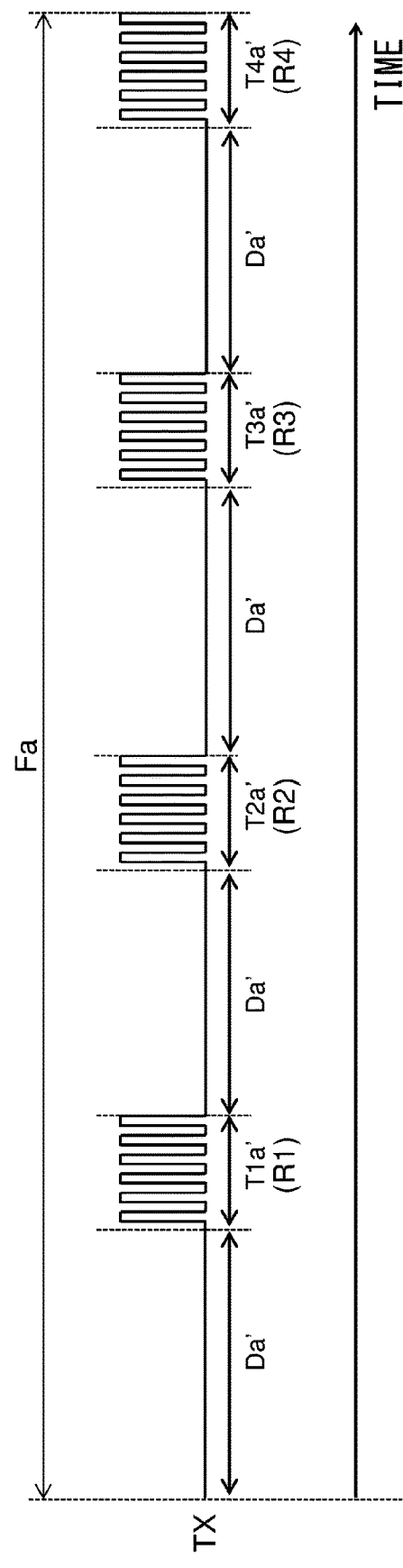
FIG. 8 shows the timing of the frame period and the waveforms of the touch drive signal according to the third embodiment used when a noise is detected.

FIG. 8 shows the timing of the frame period Fa and the waveforms of the touch drive signal TX according to the third embodiment used when a noise is detected. The frame period Fa does include sub-frame periods and includes four display periods Da' and four touch detection periods T1a' through T4a'. Thus, the number of touch detection periods is smaller and the number of display periods Da' is also smaller in the frame period F1 as compared with the case where no noise is detected.

The length of the display period Da' is twice the length of the display period Da used when no noise is detected. In the case of FHD (full high definition), for example, 1080 lines of one screen are rendered in a frame period Fa. Therefore, 135 lines are rendered in one display period Da when no noise is detected, and 270 lines are rendered in one display period Da' when a noise is detected.

When a noise is detected, the touch detection circuit 76 performs detection of a touch for each touch detection period, based on the touch detection signal RX received in each touch detection period. The length of the touch detection period is the detection time. The length of each of the touch detection periods T1a' through T4a' is, for example, 400 μs, which is twice the length 200 μs of each of the touch detection periods T1a through T4a used when no noise is detected. Therefore, the number of pulses of the touch drive signal TX included in one touch detection period is equal to the number of pulses of the touch drive signal TX included in one touch detection period when no noise is detected. This ensures an equivalent touch detection sensitivity and suppresses the sensitivity from decreasing.

Further, the number of divisions of the frame period Fa is reduced as compared with the first embodiment so that the control exercised when a noise is detected is more simplified.

Fourth Embodiment

The fourth embodiment differs from the third embodiment in that the frequency used when a noise is detected is configured to be 1/1.5 times the original. The difference from the third embodiment will be highlighted below.

Figure 9:
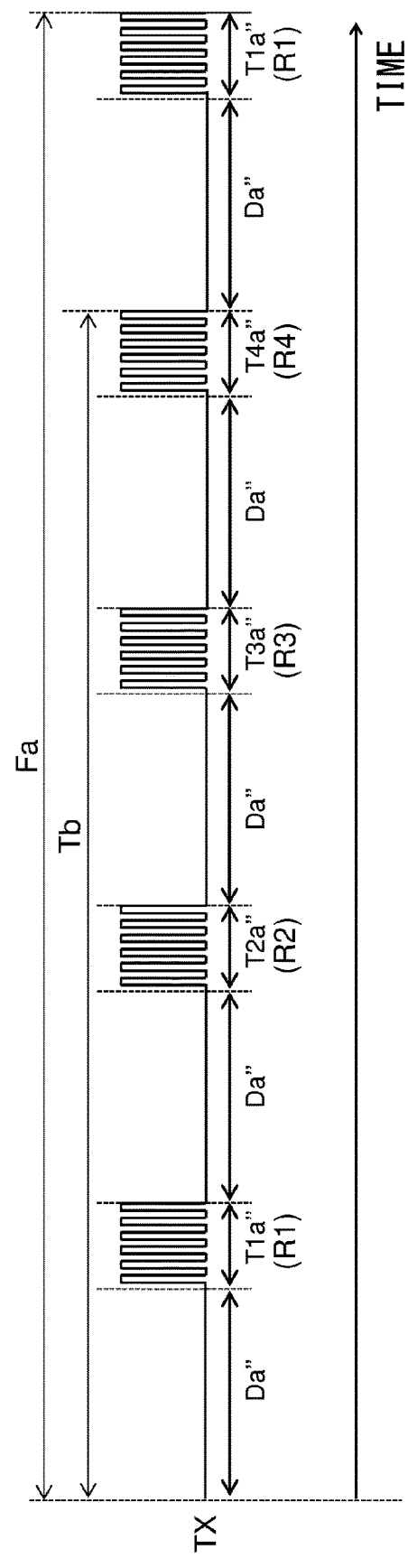
FIG. 9 shows the timing of the frame period and the waveforms of the touch drive signal according to the fourth embodiment used when a noise is detected.

FIG. 9 shows the timing of the frame period Fa and the waveforms of the touch drive signal TX according to the fourth embodiment used when a noise is detected. The frame period Fa includes five display periods Da" and five touch detection periods T1a" through T4a", T1a". The display period Da", the touch detection period T1a", the display period Da", the touch detection period T2a", the display period Da", the touch detection period T3a", the display period Da", the touch detection period T4a", the display period Da", and the touch detection period T1a" are arranged in this order. 216 lines are rendered in each display period Da".

The second frequency is 1/1.5 times the first frequency used when no noise is detected. The length of each of the touch detection periods T1a" through T4a" is 300 μs, which is 1.5 times the length of each of the touch detection periods T1a through T4a used when no noise is detected. Therefore, the number of pulses of the touch drive signal TX included in one touch detection period is equal to the number of pulses of the touch drive signal TX included in one touch detection period when no noise is detected. This ensures an equivalent touch detection sensitivity and suppresses the sensitivity from decreasing.

A touch for one screen is detected in the four touch detection periods T1a" through T4a", and a touch report is output for each period Tb. The touch report rate is 75 (=60×5/4) Hz and can be configured to be higher than that of the third embodiment. Since the touch report rate is higher than the frame rate for displaying images so that it is made easier to reflect the latest content of the touch report in the frame rendered in the subsequent frame period Fa.

The touch detection result in the touch detection region R1 in the last touch detection period T1a" is included in the touch report in the next frame period Fa. The next frame period Fa includes the touch detection periods T2a" through T4a", T1a", T2a" in this order. In other words, the first touch detection period changes in the order T1a", T2a", T3a", T4a" in consecutive multiple frame periods Fa.

The second frequency may not be limited to 1/1.5 times the first frequency and may be 1/n times (n is a real number larger than 1) the first frequency. The second time may be n times the first time. The value of n can be determined as appropriate through experiments or simulation depending on the length of the touch detection period, the performance of the touch detection circuit 76, etc. Depending on the value of n, the number and length of the display periods in the frame period Fa, and the number and length of the touch detection periods are defined in advance.

According to this embodiment, the scope of selection of the frequency of the touch drive signal TX used when a noise is detected can be expanded.

In the first through fourth embodiments described above, the length of the frame period Fa remains unchanged regardless of whether a noise is detected or not. In the following embodiments, the length of the frame period is extended when a noise is detected.

Fifth Embodiment

The fifth embodiment differs from the first embodiment in that the length of a frame period used when a noise is detected is twice the length of a frame period used when no noise is detected. The difference from the first embodiment will be highlighted below.

Figure 10:
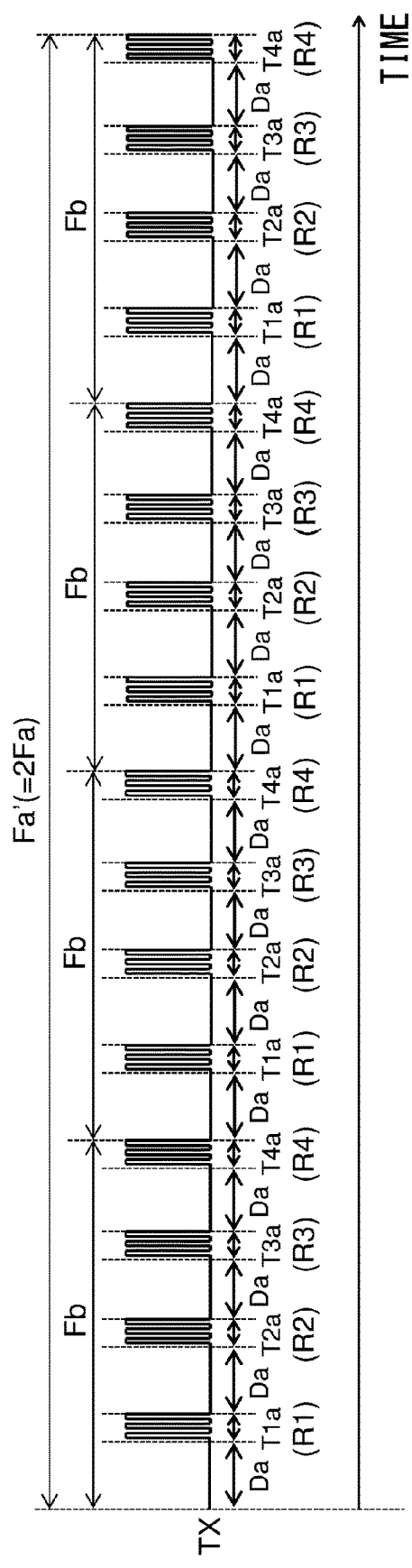
FIG. 10 shows the timing of the frame period and the waveforms of the touch drive signal according to the fifth embodiment used when a noise is detected.

FIG. 10 shows the timing of the frame period Fa' and the waveforms of the touch drive signal TX according to the fifth embodiment used when a noise is detected. A frame period Fa' is configured to be 33.4 (=1/30) ms, which is twice the period used when no noise is detected, and the frame rate is 30 Hz. The frame period Fa' includes four sub-frame periods Fb. The length and configuration of each sub-frame period Fb are the same as the length and configuration of the sub-frame period Fb of FIG. 6B.

Image data DD is data having a frame rate of 60 Hz so that the display device 22 displays one frame per data for two frames. In other words, display device 22 displays every second frame and does not display half of multiple frames. In this case, too, the image quality does not degrade so much when images exhibiting relatively low-speed variation such as those of a car navigation screen are displayed.

Touch detection for one screen is performed twice in the frame period Fa' and so is performed at a period of about 16.7 (=1/60) ms. Therefore, the touch report rate is 60 Hz, and it is ensured that the number of times the touch report is output per frame period Fa' when a noise is detected is equal to the number of times the touch report is output per frame period Fa when no noise is detected.

When a noise is detected, the touch detection circuit 76 may perform, based on the touch detection signal RX received in the four touch detection periods T1a through T4a, detection of a touch in one touch detection region for each set of the four touch detection periods. In this case, the second frequency of the touch drive signal TX is configured to be ¼ the first frequency. The length of the four touch detection periods is the detection time. The touch report rate is 30 Hz and is equal to the frame rate. The number of detection values obtained in the four touch detection periods is equal to the number obtained when no noise is detected so that the sensitivity is suppressed from decreasing. Accordingly, the frequency of the touch drive signal TX can be lowered as compared with that of the first embodiment so that the scope of selection of the frequency can be expanded.

Sixth Embodiment

According to the sixth embodiment, the second embodiment is modified such that the length of a frame period used when a noise is detected is twice the length of a frame period used when no noise is detected. The difference from the second embodiment will be highlighted below.

Figure 11:
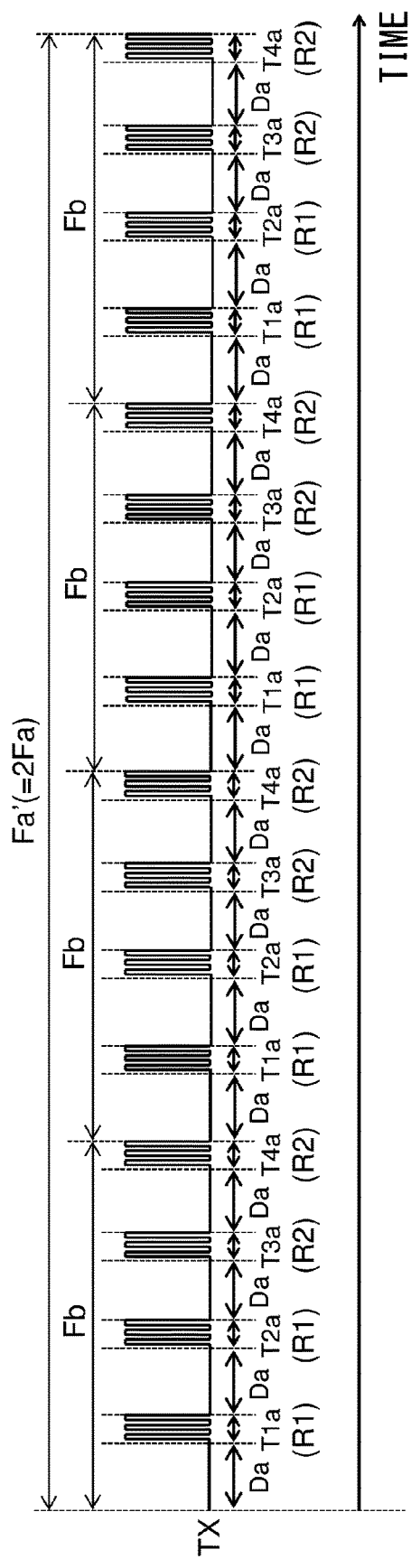
FIG. 11 shows the timing of the frame period and the waveforms of the touch drive signal according to the sixth embodiment used when a noise is detected.

FIG. 11 shows the timing of the frame period Fa' and the waveforms of the touch drive signal TX according to the sixth embodiment used when a noise is detected. The frame period Fa' includes four sub-frame periods Fb. The configuration of each sub-frame period Fb is equal to the configuration of the sub-frame period Fb of FIG. 7. Touch detection for one screen is performed four times per frame period Fa'. Accordingly, the touch report rate is 120 Hz, and the touch report rate used when a noise is detected can be made equal to the rate used when no noise is detected.

Seventh Embodiment

The seventh embodiment differs from the fifth embodiment in that the sequence of touch detection regions in which detection of a touch is performed when a noise is detected differs from that of the fifth embodiment. The difference from the fifth embodiment will be highlighted below.

Figure 12:
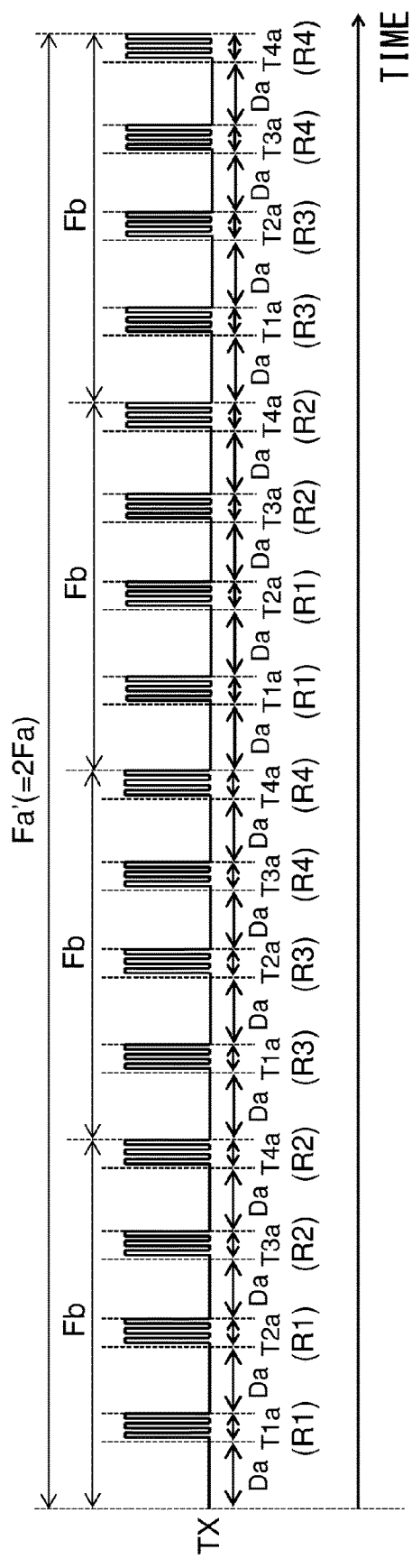
FIG. 12 shows the timing of the frame period and the waveforms of the touch drive signal according to the seventh embodiment used when a noise is detected.

FIG. 12 shows the timing of the frame period Fa and the waveforms of the touch drive signal TX according to the seventh embodiment used when a noise is detected. In the first sub-frame period Fb, the touch detection circuit 76 performs detection of a touch in the touch detection region R1 based on the touch detection signal RX received in the two touch detection periods T1a and T2a and performs detection of a touch in the touch detection region R2 based on the touch detection signal RX received in the two touch detection periods T3a and T4a.

In the second sub-frame period Fb, the touch detection circuit 76 performs detection of a touch in the touch detection region R3 based on the touch detection signal RX received in the two touch detection periods T1a and T2a and performs detection of a touch in the touch detection region R4 based on the touch detection signal RX received in the two touch detection periods T3a and T4a.

In the third sub-frame period Fb, the same control as exercised in the first sub-frame Fb is exercised. In the fourth sub-frame Fb, the same control as exercised in the second sub-frame period Fb is exercised.

According to this embodiment, a touch is detected for each set of two adjacent touch detection periods sandwiching one display period Da so that the control is more simplified than the fifth embodiment.

Eighth Embodiment

According to the eighth embodiment, the third embodiment is modified such that the length of the frame period used when a noise is detected is configured to be twice the length of the frame period used when no noise is detected. The difference from the third embodiment will be highlighted below.

Figure 13:
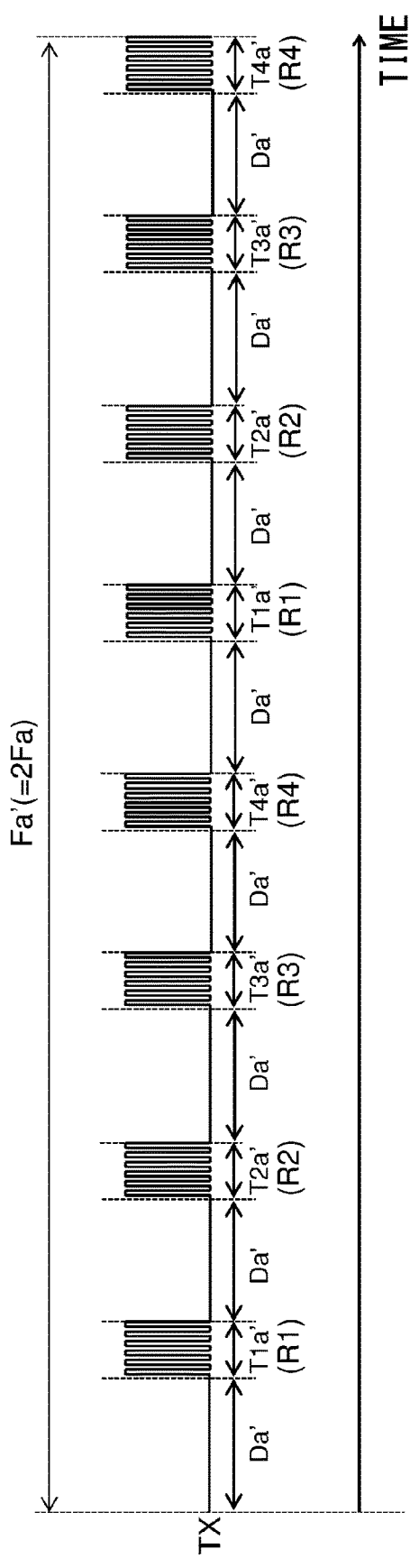
FIG. 13 shows the timing of the frame period and the waveforms of the touch drive signal according to the eighth embodiment used when a noise is detected.

FIG. 13 shows the timing of the frame period Fa' and the waveforms of the touch drive signal TX according to the eighth embodiment used when a noise is detected. The frame period Fa' includes two configurations of the frame period Fa of FIG. 8. Touch detection for one screen is performed twice in the frame period Fa'. Therefore, the touch report rate is 60 Hz, and it is ensured that the number of times the touch report is output per frame period Fa' when a noise is detected is equal to the number of times the touch report is output per frame period Fa when no noise is detected.

Ninth Embodiment

The ninth embodiment differs from the second embodiment in that noise at the first frequency is checked periodically when a noise is detected and switching to the second frequency takes place. The difference from the second embodiment will be highlighted below.

Figure 14:
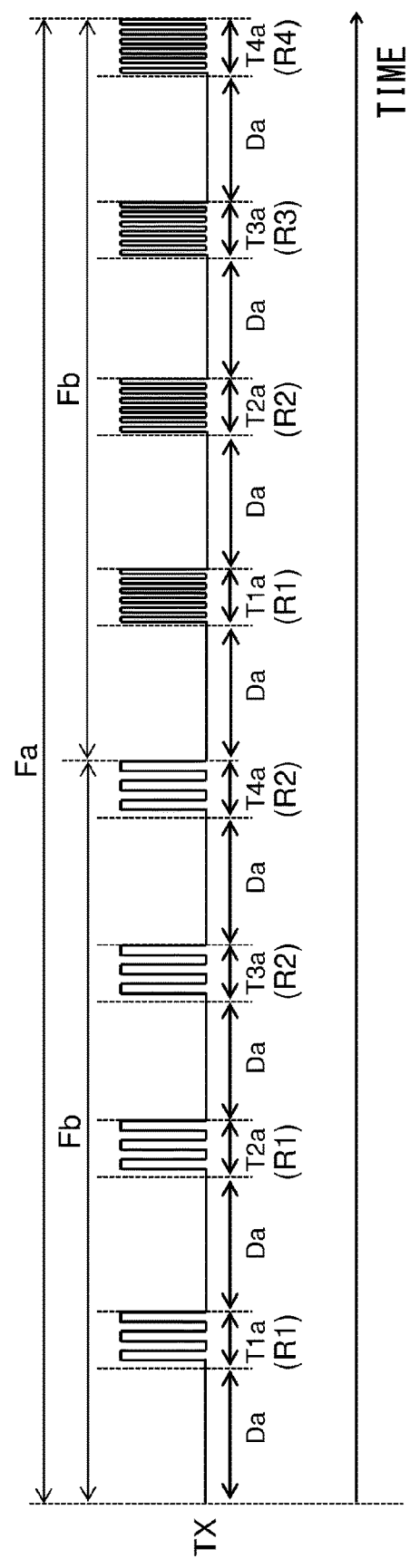
FIG. 14 shows the timing of the frame period and the waveforms of the touch drive signal according to the ninth embodiment used when a noise is detected.

FIG. 14 shows the timing of the frame period Fa and the waveforms of the touch drive signal TX according to the ninth embodiment used when a noise is detected. A predetermined number of frame periods Fa preceding the illustrated frame period Fa are the same as the frame period Fa of FIG. 7, respectively. In the first sub-frame period Fb of FIG. 14, the same control as exercised in the sub-frame period Fb of FIG. 7 is exercised. In the second sub-frame period Fb, the same control as exercised in the sub-frame period Fb of FIG. 6A is exercised.

Thus, when a noise at the first frequency is detected and the frequency of the touch drive signal TX is changed to the second frequency, the control circuit 70 exercises the same control as exercised in the sub-frame period Fb of FIG. 6A and returns the frequency of the touch drive signal TX to the first frequency each time a predetermined number of sub-frames Fb, i.e., a predetermined period of time, passes. The touch detection circuit 76 then performs detection of a noise at the first frequency during the sub-frame period Fb.

When a noise at the first frequency is not detected, the control circuit 70 determines the frequency of the touch drive signal TX to be the first frequency and determines the detection time to be the detection time used when no noise is detected. This ensures that the same control as exercised in the sub-frame period Fb of FIG. 6A continues to be exercised. Thus, when the noise at the first frequency is reduced after the noise at the first frequency is detected, it is possible to return to the control exercised when a noise at the first frequency is not detected and a touch can be detected in the four touch detection regions R1 through R4, even if a noise at the second frequency is small.

When a noise at the first frequency is detected in the second sub-frame period Fb of FIG. 14, the control circuit 70 changes the frequency of the touch drive signal TX to the second frequency and configures the detection time to be longer than the detection time used when no noise is detected. This ensures that the control exercised in the sub-frame period Fb of FIG. 7 is exercised in a predetermined number of subsequent sub-frame periods Fb. Accordingly, false detection due to a noise continues to be suppressed, and, at the same time, the touch detection sensitivity continues to be suppressed from decreasing.

Figure 15:
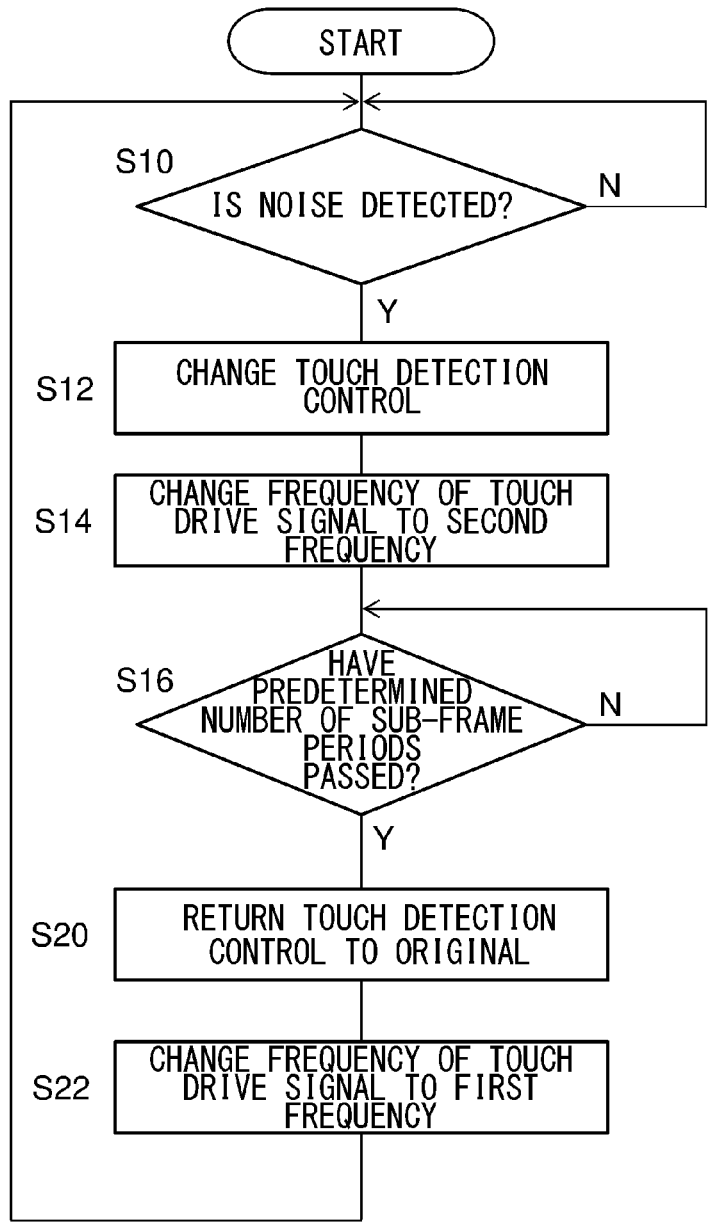
FIG. 15 is a flowchart showing a noise detection process of the display system according to the ninth embodiment.

FIG. 15 is a flowchart showing a noise detection process of the display system 1 according to the ninth embodiment. The process is started when the display system 1 is started. When a noise at the first frequency is not detected (N in S10), control returns to S10. When a noise at the first frequency is detected (Y in S10), the control circuit 70 changes touch detection control by the touch detection circuit 76 (S12) and changes the frequency of the touch drive signal TX to the second Frequency (S14). When a predetermined number of sub-frame periods Fb have not passed (N in S16), control returns to S16. When a predetermined number of sub-frame periods Fb have passed (Y in S16), the control circuit 70 returns touch detection control to original (S20), changes the frequency of the touch drive signal TX to the first frequency (S22), and returns to S10.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

For example, the third embodiment may be combined with the second embodiment. The fourth embodiment may be combined with any of the first, second, fourth through ninth embodiments. The ninth embodiment may be combined with any of the first, third through eighth embodiments. A new embodiment created by a combination will provide the combined advantages of the embodiments combined.

Noise detection for frequency hopping may be performed by stopping the supply of the touch drive signal TX. In this case, a noise detection period is provided between two adjacent frame periods Fa, for each set of a predetermined number of frame periods Fa. The second drive circuit 74 stops the supply of the touch drive signal TX and supplies the reference voltage VCOM in the noise detection period. In the noise detection period, the touch detection circuit 76 measures the level of noise at the frequency of the touch drive signal TX included in the touch detection signal RX received from multiple common electrodes 34.

Alternatively, the touch detection circuit 76 may measure, in the noise detection period, the level of noise at a predetermined multiple frequencies such as the first frequency and the second frequency included in the touch detection signal RX received from multiple common electrodes 34. When a noise at the first frequency with a predetermined level or higher is detected, the control circuit 70 changes the frequency of the touch drive signal TX to a frequency that results in the minimum noise level. According to these variations, the flexibility of the configuration of the display system 1 can be improved.

Further, the control device 24 is included in the touch display 20 in the embodiments, but the control device 24 may be included in the host 10. In the embodiment, the first drive circuit 72 generates the reference clock signal. Alternatively, the second drive circuit 74 may generate the reference clock signal. The frame period may include touch detection periods three times the number of touch detection regions on the display device 22 or larger. According to these variations, the flexibility of the configuration of the display system 1 can be improved.

A display system according to an aspect of the present disclosure includes: a display device including a plurality of common electrodes used for both image display and touch detection; a drive circuit that supplies a touch drive signal to each of the plurality of common electrodes; a touch detection circuit that performs detection of a touch by an object to the display device, based on a touch detection signal received from each of the plurality of common electrodes in one or more touch detection periods, a length of the one or more touch detection periods being a detection time; and a control circuit that controls the drive circuit and the touch detection circuit, wherein, within a frame period of the display device, a display period for which the display device displays an image and a touch detection period are alternately arranged, wherein the touch detection circuit detects a noise at a frequency of the touch drive signal based on the touch detection signal, and wherein, when the noise is detected, the control circuit changes the frequency of the touch drive signal to be lower than the frequency used when the noise is not detected and changes the detection time to be longer than the detection time used when the noise is not detected.

According to this aspect, the frequency of the touch drive signal is changed to be lowered and the detection time is changed to be longer when a noise at the frequency of the touch drive signal is detected. Accordingly, false detection due to a noise is suppressed, and, at the same time, the touch detection sensitivity is suppressed from decreasing.

The display system according to an aspect of the present disclosure may be configured, for example, such that a length of the touch detection period used when the noise is detected is equal to the length of the touch detection period used when the noise is not detected, wherein, when the noise is not detected, the touch detection circuit performs detection of a touch for each touch detection period based on the touch detection signal received in each touch detection period, and wherein, when the noise is detected, the touch detection circuit performs, based on the touch detection signal received in a predetermined number of touch detection periods, detection of a touch for each set of the predetermined number of touch detection periods.

In this case, the length of the touch detection period remains equal when a noise is detected and when a noise is not detected so that an image of an equivalent image quality is displayed.

The display system according to an aspect of the present disclosure may be configured, for example, such that a length of the touch detection period used when the noise is detected is longer than a length of the touch detection period used when the noise is not detected, and the touch detection circuit performs detection of a touch for each touch detection period based on the touch detection signal received in each touch detection period.

In this case, the number of divisions of the frame period used when a noise is detected is reduced so that the control is simplified.

The display system according to an aspect of the present disclosure may be configured, for example, such that the display device includes a plurality of touch detection regions, and, of the plurality of common electrodes, two or more common electrodes are arranged in each touch detection region, wherein the touch detection circuit performs, based on the touch detection signal received in one or more touch detection periods from the common electrodes in the touch detection region as a detection target, a touch in the touch detection region as a detection target for each set of the one or more touch detection periods, wherein the touch detection circuit performs detection of a touch in each of the plurality of touch detection regions when the noise is not detected, and performs, when the noise is detected, detection of a touch in part of the plurality of touch detection regions and does not perform detection of a touch in rest of the plurality of touch detection regions.

In this case, the touch report rate is suppressed from decreasing when a noise is detected.

The display system according to an aspect of the present disclosure may be configured, for example, such that the display device includes a plurality of touch detection regions, and, of the plurality of common electrodes, two or more common electrodes are arranged in each touch detection region, wherein the touch detection circuit performs, based on the touch detection signal received in one or more touch detection periods from the common electrodes in the touch detection region as a detection target, a touch in the touch detection region as a detection target for each set of the one or more touch detection periods, wherein the touch detection circuit performs detection of a touch in each of the plurality of touch detection regions when the noise is not detected, and performs, when the noise is detected, detection of a touch in part of the plurality of touch detection regions and does not perform detection of a touch in rest of the plurality of touch detection regions.

In this case, the touch report rate is suppressed from decreasing when a noise is detected.

The display system according to an aspect of the present disclosure may be configured, for example, such that a length of the frame period used when the noise is detected is equal to a length of the frame period used when the noise is not detected.

In this case, an image of an image quality equivalent to that of a case where no noise is detected is displayed when a noise is detected.

The display system according to an aspect of the present disclosure may be configured, for example, such that a length of the frame period used when the noise is detected is longer than a length of the frame period used when the noise is not detected.

In this case, the number of times a touch report is output per a frame period when a noise is detected is suppressed from decreasing.

The display system according to an aspect of the present disclosure may be configured, for example, such that, when the noise is detected, the control circuit changes the frequency of the touch drive signal to 1/n time (n is a real number larger than 1) the frequency used when the noise is not detected and changes the detection time to n times the detection time used when the noise is not detected.

In this case, the scope of selection of the frequency of the touch drive signal used when a noise is detected is expanded.

The display system according to an aspect of the present disclosure may be configured, for example, such that the frequency of the touch drive signal used when the noise is not detected is a first frequency, wherein the frequency of the touch drive signal used when the noise is detected is a second frequency, when the frequency of the touch drive signal is changed to the second frequency, the control circuit returns the frequency of the touch drive signal to the first frequency when a predetermined period of time passes, and determines the frequency of the touch drive signal to be the first frequency and determines the detection time to be detection time used when the noise is not detected when a noise at the first frequency is not detected.

In this case, the configuration used when no noise is detected is resumed when the noise at the first frequency is reduced.

A control device according to an aspect of the present disclosure is a control device adapted to control a display device including a plurality of common electrodes used for both image display and touch detection, the control device including: a drive circuit that supplies a touch drive signal to each of the plurality of common electrodes; a touch detection circuit that performs detection of a touch by an object to the display device, based on a touch detection signal received from each of the plurality of common electrodes in one or more touch detection periods, a length of the one or more touch detection periods being a detection time; and a control circuit that controls the drive circuit and the touch detection circuit, wherein, within a frame period of the display device, a display period for which the display device displays an image and a touch detection period are alternately arranged, wherein the touch detection circuit detects a noise at a frequency of the touch drive signal based on the touch detection signal, and wherein, when the noise is detected, the control circuit changes the frequency of the touch drive signal to be lower than the frequency used when the noise is not detected and changes the detection time to be longer than the detection time used when the noise is not detected.

According to this aspect, false detection due to a noise is suppressed, and, at the same time, the touch detection sensitivity is suppressed from decreasing.

A control method according to an aspect of the present disclosure is a control method adapted for a display device including a plurality of common electrodes used for both image display and touch detection, a display period for which the display device displays an image and a touch detection period being alternately arranged within a frame period of the display device, the control method including: supplying a touch drive signal to each of the plurality of common electrodes; performing detection of a touch by an object to the display device, based on a touch detection signal received from each of the plurality of common electrodes in one or more touch detection periods, a length of the one or more touch detection periods being a detection time; detecting a noise at a frequency of the touch drive signal based on the touch detection signal; and changing, when the noise is detected, the frequency of the touch drive signal to be lower than the frequency used when the noise is not detected and changing the detection time to be longer than the detection time used when the noise is not detected.

According to this aspect, false detection due to a noise is suppressed, and, at the same time, the touch detection sensitivity is suppressed from decreasing.

While various embodiments have been described herein above, it is to be appreciated that various changes in form and detail may be made without departing from the spirit and scope of the invention(s) presently or hereafter claimed.

CROSS-REFERENCE TO RELATED APPLICATIONS

This application is a Continuation of International Application No. PCT/JP2020/027708, filed on Jul. 16, 2020, which in turn claims the benefit of Japanese Application No. 2019-145168, filed on Aug. 7, 2019, the disclosures of which Applications are incorporated by reference herein.

The invention claimed is:

1. A display system, comprising:
a display device comprising a plurality of common electrodes used for both image display and touch detection;
a drive circuit that supplies a touch drive signal to each of the plurality of common electrodes;
a touch detection circuit that performs detection of a touch by an object to the display device, based on a touch detection signal received from each of the plurality of common electrodes in one or more touch detection periods, a length of the one or more touch detection periods being a detection time; and
a control circuit that controls the drive circuit and the touch detection circuit,
wherein, within a frame period of the display device, a display period for which the display device displays an image and a touch detection period are alternately arranged,
wherein the touch detection circuit detects a noise at a frequency of the touch drive signal based on the touch detection signal,
wherein, when the noise is detected, the control circuit changes the frequency of the touch drive signal to be lower than the frequency used when the noise is not detected and changes the detection time to be longer than the detection time used when the noise is not detected,
wherein the display device includes a plurality of touch detection regions, and, of the plurality of common electrodes, two or more common electrodes are arranged in each touch detection region,
wherein the touch detection circuit performs, based on the touch detection signal received in one or more touch detection periods from the common electrodes in the touch detection region as a detection target, a touch in the touch detection region as the detection target for each set of the one or more touch detection periods,
wherein the touch detection circuit
performs detection of a touch in each of the plurality of touch detection regions when the noise is not detected, and
performs, when the noise is detected, detection of a touch in part of the plurality of touch detection regions and does not perform detection of a touch in rest of the plurality of touch detection regions.

2. The display system according to claim 1,
wherein a length of the touch detection period used when the noise is detected is equal to the length of the touch detection period used when the noise is not detected,
wherein, when the noise is not detected, the touch detection circuit performs detection of a touch for each touch detection period based on the touch detection signal received in each touch detection period, and
wherein, when the noise is detected, the touch detection circuit performs, based on the touch detection signal received in a predetermined number of touch detection periods, detection of a touch for each set of the predetermined number of touch detection periods.

3. The display system according to claim 1,
wherein a length of the touch detection period used when the noise is detected is longer than a length of the touch detection period used when the noise is not detected, and the touch detection circuit performs detection of a touch for each touch detection period based on the touch detection signal received in each touch detection period.

4. The display system according to claim 1,
wherein a length of the frame period used when the noise is detected is equal to a length of the frame period used when the noise is not detected.

5. The display system according to claim 1,
wherein a length of the frame period used when the noise is detected is longer than a length of the frame period used when the noise is not detected.

6. The display system according to claim 1,
when the noise is detected, the control circuit changes the frequency of the touch drive signal to 1/n time (n is a real number larger than 1) the frequency used when the noise is not detected and changes the detection time to n times the detection time used when the noise is not detected.

7. The display system according to claim 1,
wherein the frequency of the touch drive signal used when the noise is not detected is a first frequency,
wherein the frequency of the touch drive signal used when the noise is detected is a second frequency,
when the frequency of the touch drive signal is changed to the second frequency, the control circuit returns the frequency of the touch drive signal to the first frequency when a predetermined period of time passes, and determines the frequency of the touch drive signal to be the first frequency and determines the detection time to be detection time used when the noise is not detected when a noise at the first frequency is not detected.

8. A control method adapted for a display device comprising a plurality of common electrodes used for both image display and touch detection, a display period for which the display device displays an image and a touch detection period being alternately arranged within a frame period of the display device, the control method comprising:
supplying a touch drive signal to each of the plurality of common electrodes;
performing detection of a touch by an object to the display device, based on a touch detection signal received from each of the plurality of common electrodes in one or more touch detection periods, a length of the one or more touch detection periods being a detection time;

detecting a noise at a frequency of the touch drive signal based on the touch detection signal; and changing, when the noise is detected, the frequency of the touch drive signal to be lower than the frequency used when the noise is not detected and changing the detection time to be longer than the detection time used when the noise is not detected, wherein the frequency of the touch drive signal used when the noise is not detected is a first frequency, wherein the frequency of the touch drive signal used when the noise is detected is a second frequency, wherein when the frequency of the touch drive signal is changed to the second frequency, returning the frequency of the touch drive signal to the first frequency when a predetermined period of time passes, and determining the frequency of the touch drive signal to be the first frequency and determining the detection time to be detection time used when the noise is not detected when a noise at the first frequency is not detected.

9. A display system, comprising:

a display device comprising a plurality of common electrodes used for both image display and touch detection;

a drive circuit that supplies a touch drive signal to each of the plurality of common electrodes;

a touch detection circuit that performs detection of a touch by an object to the display device, based on a touch detection signal received from each of the plurality of common electrodes in one or more touch detection periods, a length of the one or more touch detection periods being a detection time; and a control circuit that controls the drive circuit and the touch detection circuit, wherein, within a frame period of the display device, a display period for which the display device displays an image and a touch detection period are alternately arranged, wherein the touch detection circuit detects a noise at a frequency of the touch drive signal based on the touch detection signal, wherein, when the noise is detected, the control circuit changes the frequency of the touch drive signal to be lower than the frequency used when the noise is not detected and changes the detection time to be longer than the detection time used when the noise is not detected, and wherein a length of the frame period used when the noise is detected is longer than a length of the frame period used when the noise is not detected.

* * * * *